United States Patent
Tuohimetsä et al.

(10) Patent No.: US 7,031,706 B2
(45) Date of Patent: Apr. 18, 2006

(54) INTERNET PROTOCOL (IP) MULTIMEDIA SUBSYSTEM (IMS) AVAILABILITY DETECTION

(75) Inventors: Sakari Tuohimetsä, Raahe (FI); Ilpo Karjalainen, Oulu (FI); Jyrki Polet, Oulu (FI); Juhani Latvakoski, Haukipudas (FI); Jussi Niskanen, Kempele (FI); Reijo Pyörälä, Jääli (FI)

(73) Assignee: Nokia Corporation, Espoo (FI)

(*) Notice: Subject to any disclaimer, the term of this patent is extended or adjusted under 35 U.S.C. 154(b) by 496 days.

(21) Appl. No.: 10/202,563

(22) Filed: Jul. 23, 2002

(65) Prior Publication Data

US 2003/0045290 A1    Mar. 6, 2003

Related U.S. Application Data

(60) Provisional application No. 60/324,759, filed on Sep. 24, 2001, provisional application No. 60/313,909, filed on Aug. 21, 2001.

(51) Int. Cl.
*H04Q 7/20* (2006.01)
*H04Q 7/00* (2006.01)

(52) U.S. Cl. .................. 455/432.3; 455/432.1; 455/433; 455/435.1; 455/419; 455/418; 370/328; 370/338; 370/352; 370/354

(58) Field of Classification Search ............ 455/432.3, 455/432.1, 433, 435.1, 435.2, 418, 419, 422.1; 370/328, 338, 352, 354
See application file for complete search history.

(56) References Cited

U.S. PATENT DOCUMENTS

| | | | |
|---|---|---|---|
| 5,613,213 A * | 3/1997 | Naddell et al. | 455/435.2 |
| 5,940,759 A * | 8/1999 | Lopez-Torres et al. | 455/433 |
| 5,943,619 A * | 8/1999 | Coyne et al. | 455/433 |
| 5,963,863 A * | 10/1999 | Berggren | 455/445 |
| 6,621,793 B1 * | 9/2003 | Widegren et al. | 370/230.1 |
| 6,636,502 B1 * | 10/2003 | Lager et al. | 370/352 |
| 6,683,853 B1 * | 1/2004 | Kannas et al. | 370/237 |
| 6,741,868 B1 * | 5/2004 | Park et al. | 455/552.1 |
| 6,757,266 B1 * | 6/2004 | Hundscheidt | 370/328 |
| 6,763,233 B1 * | 7/2004 | Bharatia | 455/433 |
| 6,826,414 B1 * | 11/2004 | Reynolds et al. | 455/555 |
| 2002/0114305 A1 * | 8/2002 | Oyama et al. | 370/338 |
| 2002/0119774 A1 * | 8/2002 | Johannesson et al. | 455/434 |
| 2002/0133600 A1 * | 9/2002 | Williams et al. | 709/228 |
| 2003/0027595 A1 * | 2/2003 | Ejzak | 455/560 |
| 2003/0120135 A1 * | 6/2003 | Gopinathan et al. | 600/300 |

OTHER PUBLICATIONS

Greis, M. et al., UMTS 2000 Update, Third Generation Systems, pp. 33-36.

* cited by examiner

*Primary Examiner*—Sonny Trinh
*Assistant Examiner*—Huy Phan
(74) *Attorney, Agent, or Firm*—Harrington & Smith, LLP

(57) ABSTRACT

A method is disclosed for providing information related to an Internet Protocol (IP) Multi-Media (IM) Subsystem (IMS) to a mobile terminal. The method includes storing the information into a memory that is readable by the mobile terminal, and reading the stored information from the memory. The memory may be at least one of a USIM, an EEPROM or a RAM. In one embodiment the information is stored during a PDP context activation procedure. A wireless communications system that operates in accordance with the method is also disclosed.

4 Claims, 3 Drawing Sheets

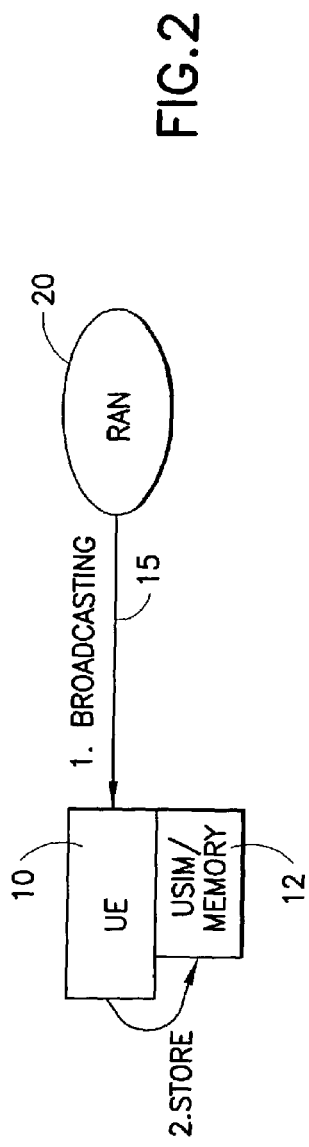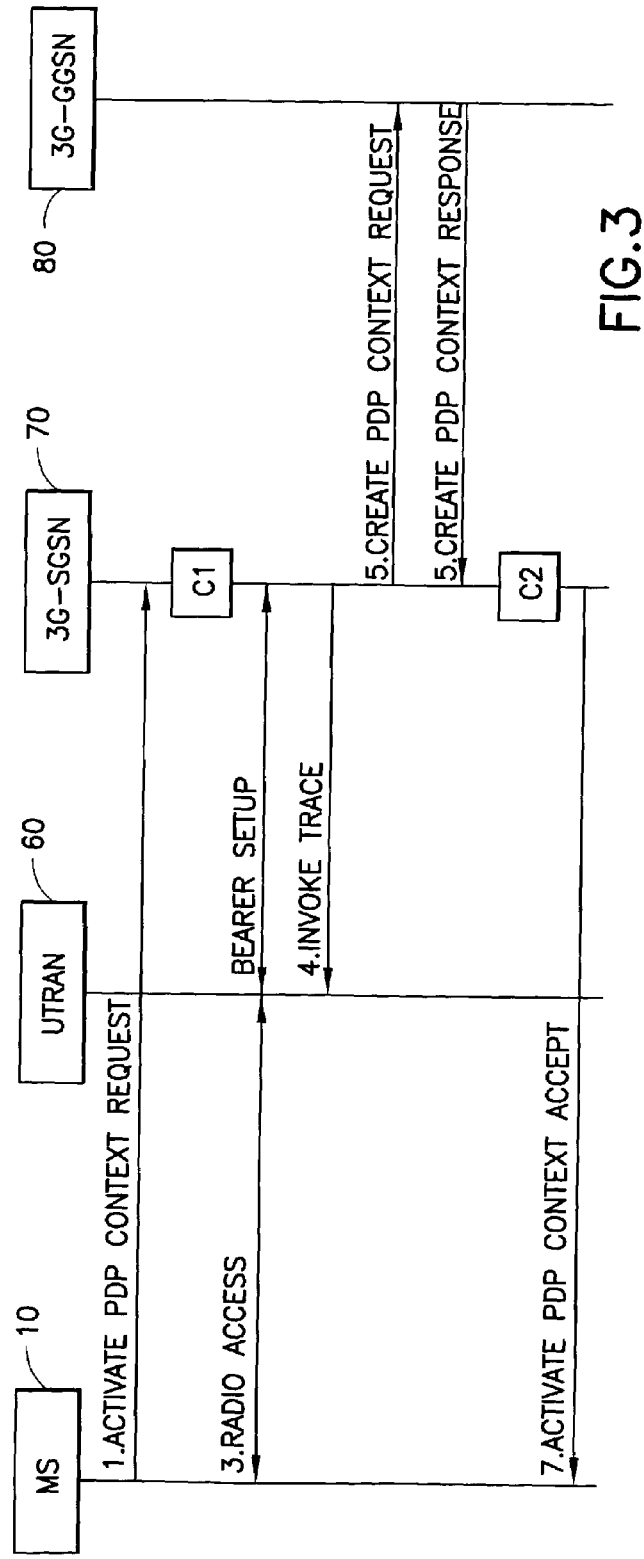

| CASE | PARAMETER P VALUE | FUNCTIONALITY |
|---|---|---|
| 1 | V1 | IMS IS AVAILABLE FOR THE USER IN THIS PLMN |
| 2 | V2 | OPERATOR HAS AN IMS, BUT THE USER HAS NO RIGHT TO ATTACH TO IT |
| 3 | V3 | NO IMS IN THIS PLMN |

| MCC | MNC | IMS AVAILABLE |
|---|---|---|

INTERNET PROTOCOL (IP) MULTIMEDIA SUBSYSTEM (IMS) AVAILABILITY DETECTION

CLAIM OF PRIORITY FROM COPENDING PROVISIONAL PATENT APPLICATIONS

This patent application claims priority under 35 U.S.C. §119(e) from Provisional Patent Application No. 60/324,759, filed Sep. 24, 2001, and from Provisional Patent Application No. 60/313,909, filed Aug. 21, 2001, the disclosures of which are incorporated by reference herein in their entireties.

TECHNICAL FIELD

These teachings relate generally to wireless digital telecommunications systems and methods and, more specifically, to third generation (3G) networks and to mobile stations that operate in such networks.

BACKGROUND

The 3G Specification references given below are relevant to the teachings of this invention:

TS22.101 Chapter 4.3:

"3GPP specifications shall provide a mechanism which will enable a piece of user equipment (UE) to adapt to different radio interfaces as necessary and to determine the service capabilities available. The specifications shall also provide a mechanism which will enable a UE to select radio interfaces capable of providing appropriate service capabilities."

TS22.228 (S1-010892)

7.2.1 Access Control

"The IM CN subsystem shall be able to verify at any time that the user is entitled to use the resources of the IM CN subsystem.

It must be possible to indicate to the terminal the reasons for denying access if this occurs, particularly when roaming. The following rejection scenarios must be supported 1. The serving network does not support IMS. The serving network shall indicate this fact to the terminal using an appropriate reject cause e.g, "No IMS available".

2. The serving network supports IMS, but the terminal is not allowed IMS service in this network as there is no roaming agreement in place between operators The serving network shall indicate this fact to the terminal using an appropriate reject cause e.g, "IMS roaming not allowed".

3. The serving network supports IMS, and roaming is allowed. In this case the terminal is allowed access to IMS, but it is still possible that service is rejected by IMS itself, e.g. due to failure of registration with the IMS."

A 3GPP Release (Rel) 4/5 network is divided into a radio access network (RAN) and a core network (CN), which are connected via an open interface. The core network is, from a functional point of view, divided into a Packet Switched (PS) Domain, an IP Multi-Media (IM) Subsystem (IMS) and a Circuit Switched (CS) Domain.

It is possible to have network configurations in which the PS domain (through which IMS is available) exists without any IM subsystem (IMS), or for the user to not have access to the IMS for some reason (e.g., no IMS roaming agreement exists).

In a typical case the home network configuration is known by the mobile terminal. However, problems emerge in the roaming case, and when the mobile terminal is first switched on, when there are several operators or Public Land Mobile Networks (PLMNs) available.

For example, if the user desires to access and use IMS services, and before a Packet Data Protocol (PDP) Context Activation procedure has been executed in the selected PLMN, the mobile terminal does not know whether there is an IMS available for the user in the visited network configuration.

In summary, the existing problems include the following: (A) how does the mobile terminal determine that there is an IMS deployed in a PLMN; and (B) how does the mobile terminal know that the user has access to an IMS in a particular PLMN?

These problems can become especially troubling when the mobile terminal is roaming in a visited network area. Currently if there are, for example, three network operators, then in the worst case the mobile terminal or the user may select the "wrong" PLMN twice before selecting the PLMN that can provide the desired IMS services. This makes the selection procedure cumbersome for the mobile terminal/user, and further can require some undesirable amount of time to accomplish. This conventional procedure also needlessly consumes some amount of network bandwidth for making the unsuccessful IMS service inquiries.

SUMMARY OF THE PREFERRED EMBODIMENTS

The foregoing and other problems are overcome, and other advantages are realized, in accordance with the presently preferred embodiments of these teachings.

These teachings enable the mobile terminal user, or a selection algorithm used by the mobile terminal, to select a network where IMS is available. These teachings are useful in the PLMN selection phase, and make the selection faster and more efficient from user's point of view.

These teachings can also reduce the network signalling load and unnecessary attempts to register to the IMS.

In accordance with these teachings the network provides information about IMS availability for the mobile terminal to aid in locating IMS services. This information is preferably provided to the mobile terminal so that it is available when selecting the PLMN for use (e.g., whether there is an IMS or not) and when it is desired to know if IMS roaming is allowed.

A method is disclosed for providing information related to an Internet Protocol (IP) Multi-Media (IM) Subsystem (IMS) to a mobile terminal, as is a wireless communications system that operates in accordance with the method. The method includes storing the information into a memory that is readable by the mobile terminal, and reading the stored information from the memory. The memory may be at least one of a USIM, an EEPROM or a RAM. In one embodiment the information is stored during a PDP Context Activation procedure.

In accordance with an aspect of these teachings the mobile terminal stores a list of what may be referred to as "equivalent PLMNs". This list can be replaced or deleted at the end of each location update procedure, routing area update procedure and GPRS attach procedure. The list of equivalent PLMN entries includes an entry for specifying IMS availability for the mobile terminal that downloads the equivalent PLMN list. The IMS availability information can be based on roaming agreements between network operators.

In another aspect of the invention the information is received by the mobile terminal as an information element of an Activate PDP Context Accept message that is sent from a Serving GPRS Support Node (SGSN) during a PDP Context Activation procedure. The information element conveys one of: (a) IMS is available to the mobile terminal in the PLMN; or (b) IMS is available in the PLMN, but not for the mobile terminal; or (c) IMS is not available in the PLMN.

The Activate PDP Context Request message is sent from the mobile terminal to the SGSN and comprises a special identifier that signals an IMS query by the mobile terminal and, when activating a PDP context, the SGSN includes a parameter P in place of a PDP address in an Activate PDP Context Accept message when responding to the Activate PDP Context Request message, where the value of P indicates the availability or the nonavailability of IMS to the mobile terminal.

In another aspect the information is descriptive of an access point name (APN) through which the IMS is available, where the value of the APN indicates the availability or the nonavailability of IMS to the mobile terminal. The value of the APN is sent to the mobile terminal in a GPRS attach procedure before a PDP Context Activation procedure.

In another aspect of this invention the information is descriptive of a Proxy Call State Control Function (pCSFS) address through which the IMS is available, and the value of the pCSCF indicates the availability or the nonavailability of IMS to the mobile terminal. The value of the pCSCF is preferably sent to the mobile terminal in a GPRS attach procedure before a PDP Context Activation procedure.

The information can also be received by the mobile terminal in a broadcast message sent from the Radio Access Network.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 depicts the broadcasting of information that is descriptive of the existence of IMS;

FIG. 3 is a signaling flow diagram showing a Packet Data Protocol (PDP) context activation procedure for UMTS that includes a capability to provide IMS-related information to the mobile terminal;

DETAILED DESCRIPTION OF THE PREFERRED EMBODIMENTS

Figure 1:
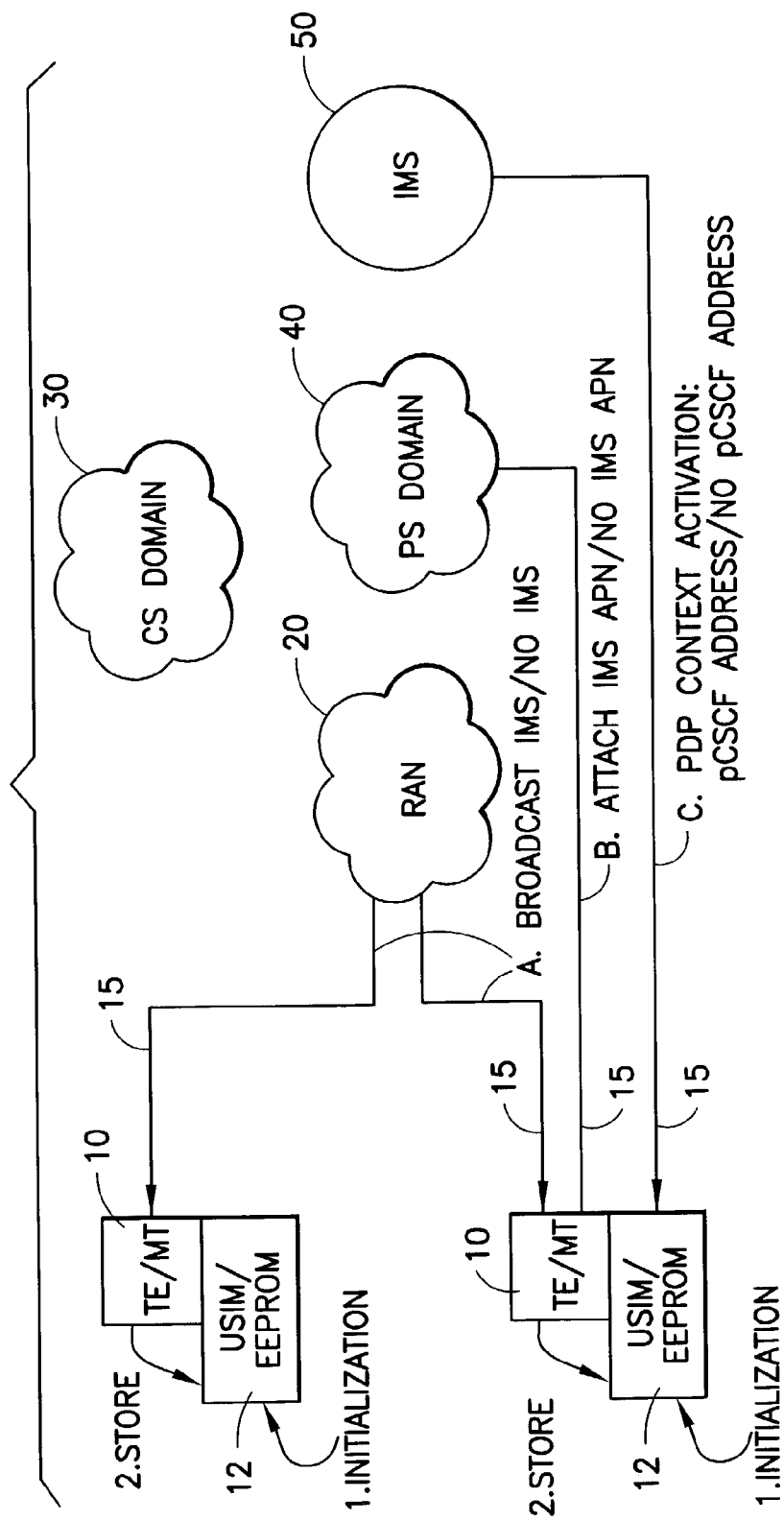
FIG. 1 is a diagram that illustrates the initialization, storing and changing of IMS control information in accordance with these teachings.

The following list of abbreviations is useful when reading the following description of the preferred embodiments, and as well when viewing the drawing figures.

| AN | Access Network |
| APN | Access Point Name |
| CN | Core Network |

-continued

| CS | Circuit Switched |
| EEPROM | Electrically Erasable and Programmable Memory |
| GGSN | Gateway GPRS Support Node |
| GPRS | General Packet Radio Service |
| IMS | IP Multimedia Subsystem |
| IP | Internet Protocol |
| MCC | Mobile Country Code |
| MNC | Mobile Network Code |
| MS | Mobile Station |
| MT | Mobile Terminal |
| pCSCF | Proxy Call State Control Function |
| PDP | Packet Data Protocol |
| PLMN | Public Land Mobile Network |
| PS | Packet Switched |
| RAM | Random Access Memory |
| RAN | Radio Access Network |
| SGSN | Serving GPRS Support Node |
| TE | Terminal Equipment |
| UE | User Equipment |
| UMTS | Universal Mobile Telecommunications System |
| USIM | UMTS Subscriber Identity Module |
| UTRAN | Universal Terrestrial Radio Access Network |

These teachings aid the mobile terminal user or the mobile terminal selection algorithm in selecting a wireless network where IMS is available. These teachings are particularly useful during the PLMN selection phase, and make the selection faster and more user-friendly. The use of the teachings in accordance with this invention also tends to reduce the network signalling load, and the number of attempts required to register to the IMS.

In accordance with these teachings the network supplies IMS control information for the mobile terminal as an aid in locating IMS services. This is especially useful when the terminal is roaming in a visited network area. Certain various mechanisms are shown in FIG. 1, and described below.

In the following description the user's equipment may be referred to as the UE 10, the TE 10, the MT 10 or as the MS 10. The UE 10 is assumed to include a memory 12, which can be, by example, a USIM and/or an EEPROM.

FIG. 1 shows two TE/MT 10, each including a USIM/EEPROM 12, variously coupled through a radio channel or channels 15 to wireless network operator components, domains and subsystems, including a RAN 10, a CS Domain 30, a PS Domain 40 and an IMS subsystem 50.

In one embodiment the network operator initializes IMS control information and stores it into the memory 12 that is readable by the MT 10, such as within an UMTS Subscriber Identity Module (USIM) when the USIM is sold to the customer. The information can be updated later, such as by using a SIM application tookit or some other similar technique. The IMS control information can also be stored into the nonvolatile memory (e.g. EEPROM) or into a RAM of the MT 10. In any case, the network operator may allow the user to change the IMS control information, and/or the network operator may change the IMS control information. The changed IMS control information is stored in the memory 12, e.g., in the USIM or in the EEPROM or in the RAM, depending on the specifics of the implementation.

However, in the most typical case the IMS control information is provided for the MT 10 dynamically after the MT 10 is switched on. The IMS control information and its delivery mechanism is divided into three levels according to the order of execution. These mechanisms (labeled for convenience as A, B and C), which may or may not exist in parallel, are described as follows.

A. IMS/no IMS

This information specifies whether there is or is not an IMS 50 in the PLMN. This information is preferably included in broadcast system information message(s), and can thus be received and read by all the MTs 10 roaming in the area of the PLMN.

Reference is made to FIG. 2, which shows the broadcasting of IMS existence or availability information in accordance with this embodiment, where the IMS existence information is broadcast in a system information message from the RAN 20 to the UE 10, and where the UE 10 stores the IMS availability information into the USIM or terminal memory (RAM/EEPROM) 12. This method is compatible with previous 3G software releases (Rel. 4 and earlier), as these earlier MTs may simply ignore the system information that is not relevant to their operation.

Note that while the broadcast information may inform the MT 10 as to the existence of the IMS 50 in the PLMN, the user may not have access to the IMS 50 because of, for example, the lack of a roaming agreement.

B. IMS APN/no IMS APN

This information is descriptive of the access point name (APN) through which the IMS 50 is available for the particular user. Specific APN values can be used, if the IMS 50 does not exist (for example NULL), or is not available (for example, −1) for the specific user. This information is preferably delivered to the MT 10 in a dedicated manner. For example, the APN information can be delivered in a GPRS attach procedure (TS23.060) before the PDP Context Activation procedure, in which the APN is to be known.

C. pCSCF Address/no pCSCF Address

This information specifies the Proxy CSCF (pCSFS) address through which the IMS 50 is available for the particular user. Specific pCSCF addresses can be used, if the IMS pCSCF does not exist (for example NULL), or is not available (for example, −1) for the specific user. This information is preferably also delivered to the MT 10 in a dedicated manner. For example, the Proxy CSCF address can be delivered in a PDP Context Activation procedure.

In accordance with a further aspect of the invention, within an Activate PDP Context Request message response (i.e., within an Activate PDP Context Accept message) there is included information (a parameter) that indicates IMS 50 availability. This parameter may be specified according to Table 1 shown in FIG. 4, and is included in the message 7 shown in FIG. 3.

In FIG. 3, and in message 1, i.e., in the Activate PDP context request message from the MS 10 to the SGSN 70, there is included a special identifier that it is used for the IMS query. This identifier also ensures compatibility with earlier software releases. Messages 3–5 employ suitable processing as needed, and also involve the participation of the GGSN 80. With regard to message 7, and when activating a signalling PDP context, the SGSN 70 may include the following parameter P in place of the PDP address in the Activate PDP Context Accept message when responding to the Activate PDP Context Request (message 1). The various parameter P values are described in Table 1, shown in FIG. 4. The exact values used for V1, V2 and V3 can be implementation specific, and are not germane to an understanding of the teachings of this invention.

Figures 4, 5:
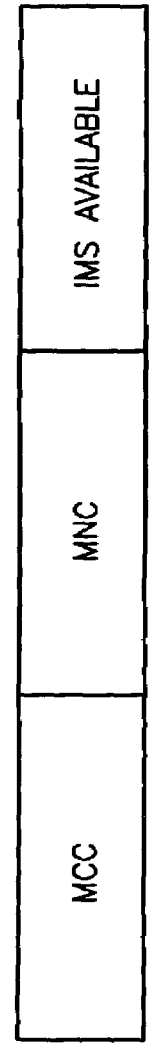
FIG. 4 is a table of IMS-related response parameters for the PDP context activation procedure of FIG. 3, in accordance with an aspect of these teachings.
FIG. 5 depicts one entry in an equivalent PLMN list in accordance with an aspect of these teachings.

A still further method (D) uses what is referred to as an equivalent PLMN list. FIG. 5 depicts one entry in an "equivalent PLMN" list in accordance with an aspect of these teachings. An entry of the equivalent PLMN list can include a MCC (Mobile Country Code) information element, a MNC (Mobile Network Code) information element and, in accordance with these teachings, an IMS Available information element.

In accordance with this aspect of these teachings the MT 10 stores a list of what may be referred to as "equivalent PLMNs". The equivalent PLMN list can be replaced or deleted at the end of each location update procedure, routing area update procedure and GPRS attach procedure (see TS23.122, TS24.008). The list of equivalent PLMN entries includes the entry (the IMS Available field) for specifying IMS availability for the MT 10 that receives the equivalent PLMN list. The IMS availability information can be based on roaming agreements made between network operators.

Those skilled in the art should realize that these teachings may be implemented in various ways, other than those specifically referred to and described above. For example, other types of messages can be used to convey the IMS information, and other message formats may be employed. Thus, this invention is not intended to be limited to only the presently preferred embodiments that are disclosed above and in the drawing figures.

What is claimed is:

1. A method, comprising:
providing information related to an Internet Protocol (IP) Multi-Media (IM) Subsystem (IMS) to a mobile terminal;
storing the information into a memory that is readable by the mobile terminal, and
reading the stored information from the memory,
where an Activate PDP Context Request message is sent from the mobile terminal to a Serving GPRS Support Node (SGSN) and comprises a special identifier that signals an IMS query by the mobile terminal; and
when activating a PDP context, the SGSN includes a parameter P in place of a PDP address in an Activate PDP Context Accept message when responding to the Activate PDP Context Request message, where the value of P indicates the availability or the nonavailability of IMS to the mobile terminal.

2. A method, comprising:
providing information related to an Internet Protocol (IP) Multi-Media (IM) Subsystem (IMS) to a mobile terminal;
storing the information into a memory that is readable by the mobile terminal, and
reading the stored information from the memory,
where the information is descriptive of a Proxy Call State Control Function (pCSFS) address through which the IMS is available, and
where the value of the pCSCF is sent to the mobile terminal in a GPRS attach procedure before a PDP Context Activation procedure.

3. A wireless communications system, comprising means for providing information from a wireless network to a mobile terminal, said information being related to availability of an Internet Protocol (IP) Multi-Media (IM) Subsystem (IMS), further comprising memory means, readable by said mobile terminal, for storing said information,
where an Activate PDP Context Request message is sent from said mobile terminal to a Serving GPRS Support Node (SGSN) and comprises a special identifier that signals an IMS query by said mobile terminal; and
when activating a PDP context, said SGSN includes a parameter P in place of a PDP address in an Activate PDP Context Accept message when responding to said Activate PDP Context Request message, where said value of P indicates said availability or said nonavailability of IMS to said mobile terminal.

4. A wireless communications system, comprising means for providing information from a wireless network to a mobile terminal, said information being related to availability of an Internet Protocol (IP) Multi-Media (IM) Subsystem (IMS), further comprising memory means, readable by said mobile terminal, for storing said information, where said information is descriptive of a Proxy Call State Control Function (pCSFS) address through which said IMS is available, and where said value of said pCSCF is sent to said mobile terminal in a GPRS attach procedure before a PDP Context Activation procedure.

* * * * *